US011376831B2

(12) United States Patent
Welvaert et al.

(10) Patent No.: US 11,376,831 B2
(45) Date of Patent: *Jul. 5, 2022

(54) FLEXIBLE LAMINATE FOR PRINTED RETORT PACKAGING

(71) Applicant: AMCOR FLEXIBLES SELESTAT SAS, Selestat (FR)

(72) Inventors: Steven Welvaert, Sint-Amandsberg (BE); Wolfgang Lohwasser, Gailingen (DE); Georgia-Venetsana Stenou, Kantza Pallini (GR); Tony Malfait, Rollegem-Kapelle (BE)

(73) Assignee: Amcor Flexibles Selestat SAS, Selestat (FR)

( * ) Notice: Subject to any disclaimer, the term of this patent is extended or adjusted under 35 U.S.C. 154(b) by 894 days.

This patent is subject to a terminal disclaimer.

(21) Appl. No.: 16/086,082

(22) PCT Filed: Feb. 20, 2017

(86) PCT No.: PCT/EP2017/053786
§ 371 (c)(1),
(2) Date: Sep. 18, 2018

(87) PCT Pub. No.: WO2017/157615
PCT Pub. Date: Sep. 21, 2017

(65) Prior Publication Data
US 2020/0290333 A1    Sep. 17, 2020

(30) Foreign Application Priority Data

Mar. 18, 2016  (EP) .................................... 16161181

(51) Int. Cl.
| | | |
|---|---|---|
| *B32B 33/00* | (2006.01) | |
| *B32B 15/09* | (2006.01) | |
| *B32B 27/08* | (2006.01) | |
| *B32B 27/32* | (2006.01) | |
| *B32B 27/34* | (2006.01) | |
| *B32B 27/36* | (2006.01) | |
| *C09D 11/101* | (2014.01) | |
| *C09D 11/104* | (2014.01) | |

(52) U.S. Cl.
CPC .............. *B32B 33/00* (2013.01); *B32B 15/09* (2013.01); *B32B 27/08* (2013.01); *B32B 27/32* (2013.01); *B32B 27/34* (2013.01); *B32B 27/36* (2013.01); *C09D 11/101* (2013.01); *C09D 11/104* (2013.01); *B32B 2255/10* (2013.01); *B32B 2255/26* (2013.01); *B32B 2307/31* (2013.01); *B32B 2307/4023* (2013.01); *B32B 2307/75* (2013.01); *B32B 2310/0887* (2013.01); *B32B 2310/14* (2013.01); *B32B 2439/70* (2013.01)

(58) Field of Classification Search
CPC ......... B32B 33/00; B32B 15/09; B32B 27/08; B32B 27/32; B32B 27/34; B32B 27/36; B32B 2255/10; B32B 2255/26; B32B 2307/31; B32B 2307/4023; B32B 2307/75; B32B 2310/0887; B32B 2310/14; B32B 2439/70; C09D 11/101; C09D 11/104
See application file for complete search history.

(56) References Cited

U.S. PATENT DOCUMENTS

| | | |
|---|---|---|
| 4,308,084 A | 12/1981 | Ohtusuki et al. |
| 4,309,466 A | 1/1982 | Stillman |
| 4,310,578 A | 1/1982 | Katsura et al. |
| 4,311,742 A | 1/1982 | Otsuka |
| 4,321,185 A | 3/1982 | Benitez |
| 4,402,172 A | 9/1983 | Krueger |
| 4,903,841 A | 2/1990 | Ohsima et al. |
| 5,273,797 A | 12/1993 | Hazelton et al. |
| 5,380,769 A | 1/1995 | Titterington et al. |
| 5,674,922 A | 10/1997 | Igarashi et al. |
| 5,731,090 A | 3/1998 | Chen |
| 5,777,576 A | 7/1998 | Zur et al. |
| 5,819,667 A | 10/1998 | Rodi |
| 5,889,084 A | 3/1999 | Roth |
| 6,162,570 A | 12/2000 | Maess et al. |
| 6,529,288 B1 | 3/2003 | Miyazaki |
| 7,886,665 B2 | 2/2011 | Biro et al. |
| 10,486,452 B2 | 11/2019 | Lohwaser et al. |
| 2002/0073857 A1 | 6/2002 | Aoyama et al. |
| 2002/0119295 A1 | 8/2002 | Speer et al. |
| 2002/0154928 A1 | 10/2002 | Bartscher et al. |
| 2003/0021961 A1 | 1/2003 | Ylitalo et al. |
| 2005/0019533 A1 | 1/2005 | Mossbrook et al. |
| 2005/0187309 A1 | 8/2005 | Watanabe |
| 2006/0000545 A1 | 1/2006 | Nageli et al. |
| 2007/0085983 A1 | 4/2007 | Ko et al. |
| 2007/0263060 A1 | 11/2007 | Laksin et al. |
| 2007/0292567 A1 | 12/2007 | Kaas et al. |
| 2008/0021570 A1 | 1/2008 | Bedard et al. |
| 2008/0118746 A1 | 5/2008 | Klenk |
| 2008/0218570 A1 | 9/2008 | Kovacs et al. |
| 2010/0136300 A1 | 6/2010 | Watanabe |
| 2011/0027543 A1 | 2/2011 | Metla |

(Continued)

FOREIGN PATENT DOCUMENTS

| | | |
|---|---|---|
| CN | 103108752 A | 5/2013 |
| EP | 0 741 644 | 8/1995 |

(Continued)

*Primary Examiner* — Michael C Miggins

(57) ABSTRACT

The present invention is related to a retortable package comprising a flexible multilayer substrate comprising a reverse-printed layer, said reverse-printed layer comprising one or more crosslinked ink layer(s), and to a method for producing said multilayer laminate.

19 Claims, No Drawings

(56) References Cited

U.S. PATENT DOCUMENTS

| | | |
|---|---|---|
| 2011/0256478 A1 | 10/2011 | Bernsdorf et al. |
| 2013/0129992 A1 | 5/2013 | Jahromi et al. |
| 2013/0233189 A1 | 9/2013 | Wittmann et al. |
| 2015/0116432 A1 | 4/2015 | Chretien et al. |
| 2015/0184005 A1 | 7/2015 | Howald et al. |

FOREIGN PATENT DOCUMENTS

| | | |
|---|---|---|
| EP | 1 159 142 | 9/2000 |
| EP | 1 232 855 A2 | 8/2002 |
| EP | 1 466 725 A1 | 10/2004 |
| EP | 1 541 340 A1 | 6/2005 |
| EP | 2 100 729 A1 | 9/2009 |
| EP | 2 133 210 A2 | 12/2009 |
| EP | 2 305 758 A1 | 4/2011 |
| EP | 2 409 848 A1 | 1/2012 |
| EP | 2 720 877 | 12/2012 |
| GB | 2 110 223 A | 6/1983 |
| JP | S57011083 | 1/1982 |
| JP | S60207101 | 10/1985 |
| JP | H02117826 A | 5/1990 |
| JP | H09267868 A | 10/1997 |
| JP | H10119218 A | 5/1998 |
| JP | H10324836 A | 12/1998 |
| JP | 2002096864 A | 4/2002 |
| JP | 2004042466 A | 2/2004 |
| JP | 2004175449 | 6/2004 |
| JP | 2005053109 A | 3/2005 |
| JP | 2005329983 | 12/2005 |
| JP | 2014513013 | 5/2014 |
| JP | 2015027774 | 2/2015 |
| JP | 2015-066721 | 4/2015 |
| WO | 9516572 A1 | 6/1995 |
| WO | WO 95/20492 A1 | 8/1995 |
| WO | WO 97/31071 A1 | 8/1997 |
| WO | WO 97/37286 A1 | 10/1997 |
| WO | WO 00/53429 A1 | 9/2000 |
| WO | WO 02/22462 A1 | 3/2002 |
| WO | WO 2008/094085 A1 | 8/2008 |
| WO | WO 2009/023520 A1 | 2/2009 |
| WO | WO 2012/173817 A2 | 12/2012 |

FLEXIBLE LAMINATE FOR PRINTED RETORT PACKAGING

FIELD OF THE INVENTION

The present invention is related to a printed flexible multilayer substrate for retort packaging and to a method for the production of said substrate.

STATE OF THE ART

Packaged food products must often be sterilized. One process for sterilizing packaged foodstuff is retorting, which is a treatment of the packaged foodstuff under heat and pressure.

Food products are increasingly being packaged in flexible retort packages as an alternative to being packaged in metal cans and glass jars. The packaging material for flexible retort packages typically includes a middle moisture and gas barrier layer, which is generally a metal foil, a metallized film, or a transparent barrier film, a polymer outer layer adhered to one side of the middle gas barrier layer and forming the exterior surface of the package, and a heat-sealable inner polymer film layer adhered to the other side of the middle gas barrier layer and forming the interior surface of the package. The packaging material may also contain an additional polymer film layer. The outer polymer film layer is generally polyester, and the inner polymer film layer is typically cast polypropylene. The additional polymer film layer may be nylon or the like.

Each of the layers is capable of withstanding a retort process without melting or substantially degrading. In general, retorting consists in heating the packaging container to a temperature comprised between 100 and 135° C., at an overpressure comprised between 0.5 and 1.1 bar, for a period of time comprised between 20 and 100 minutes.

Laminates for retort packaging are disclosed in for example U.S. Pat. Nos. 4,310,578 A; 4,311,742 A; 4,308,084 A; 4,309,466 A; 4,402,172 A; 4,903,841 A; 5,273,797 A; 5,731,090 A; EP 1 466 725 A1; JPH 09 267 868 A; JP 2002 096 864 A and JP 2015 066 721 A.

Where it is desired to print the package with indicia and/or graphics, the outer layer of the laminate may be reverse-printed prior to be laminated to an additional layer. On the other hand, the outward-facing surface of the laminate may be printed and subsequently covered with a retortable lacquer.

JPH 02 117 826 A discloses a packaging material comprising a printed polyethylene terephthalate layer with a polycarbonate, polypropylene or fluorine protecting layer on the outer surface and an aluminum foil and a polypropylene film on the inner surface of the printing film layer.

EP 1 232 855 A2 discloses a laminate including an outer polyethylene terephthalate layer, a nylon second layer, and a polypropylene inner layer. A solvent-free adhesive including surface-modified exfoliated montmorillonite clay platelets is used to bond the layers together. The polyethylene terephthalate layer may be reverse printed with specific ink systems.

EP 2 100 729 A1 discloses a laminate comprising a biaxially oriented plastic layer as outer layer and a sealable layer as inner layer and optionally at least one middle layer, wherein the outer layer is front printed and wherein the ink printing is over lacquered with a thermal protective lacquer.

EP 1 541 340 A1 discloses a laminate comprising a first multilayer structure comprising a reverse of surface printed carrier layer and a gas barrier layer and a second multilayer structure comprising a seal layer, at least one migration barrier layer, at least one barrier layer and a white or light colored layer.

The art of laminate printing and decoration is dominated by liquid ink processes that are based on drying or curing individual ink layers through the evaporation of water or volatile organic compounds. These processes consume high amounts of energy and often negatively affect the environment due to the emission of solvent or greenhouse gases in the atmosphere. US 2011/0027543 A1 discloses a polyurethane resin which is particularly suitable for use in printing inks for laminating packaging applications. The polyurethane resin maintains its lamination bond strength before and after the laminate printed with the ink containing the polyurethane resin is subjected to sterilization conditions.

The introduction of radiation curable inks, such as ultraviolet (UV) and electron beam (EB) curable inks helps to reduce solvent emissions and considerably increases print throughput.

Two main technologies are used in radiation curable inks. The first uses free radical species to initiate the polymerization of reactive functional groups, more particularly ethylenically unsaturated double bonds. The most commonly used reactive groups are (meth)acrylate and more particularly acrylate groups, as disclosed for example in WO 97/31071 A1, US 2015/0116432 A1 and US 2015/0184005 A1.

Another technology used in radiation curing is the generation of very strong acids to initiate the cationic polymerization of reactive functional groups such as for example, cyclic ethers such as oxirane or oxethane, preferably alicyclic epoxides, allyl ethers and vinyl ethers, as disclosed for example in U.S. Pat. No. 5,674,922 A and US 2010/0136300 A1.

The use of radiation curable inks in printing flexible packaging is disclosed in for example US 2008/021570 A1; EP 2 133 210 A1; EP 2 720 877 A1; EP 0 741 644 A1; EP 2 305 758 A1; US 2002/119295 A1; EP 1 159 142 A1; US 2013/0233189 A1 and US 2005/019533 A1.

WO 2002/022462 A1 discloses a retortable laminate comprising a core layer and a first plastic layer selected from the group consisting of polyethylene, polypropylene, polyethylene terephthalate and mixtures thereof, said plastic layer being provided with a printing ink, wherein the printing is protected by a transparent, ultraviolet or electron beam curable lacquer layer. The printing ink is selected from the group consisting of radiation curable printing inks, acrylate-based printing inks, polyvinyl butyral-based printing inks and water-based printing inks.

WO 2008/094085 A1 discloses a retortable laminate comprising a decorative print obtained from UV-curable printing inks wholly or partly coated with an outer layer of UV-cured lacquer.

Among the drawbacks and/or limitations of radiation curable inks, the presence of residual low molecular weight compounds and ink film brittleness are characteristic.

In addition to the conventional printing technologies applied in the flexible packaging, such as heliogravure and flexographic printing, new technologies emerged in the past decades and became more or less successful.

Among these new technologies, digital printing such as for example ink-jet printing and liquid electrography, is most noticeable.

Digital printing devices and methods are known in the printing arts and are generally described in for example US 2002/154928 A1; U.S. Pat. No. 6,529,288 B1; US 2002/073857 A1; WO 97/37286 A1; U.S. Pat. Nos. 5,819,667 and 5,777,576 A.

Electrographic printing on plastic, paper or metal is for example disclosed in US 2011/0256478.

JP 2015 027 774 A discloses a retortable digital printed laminate, said laminate comprising a reverse-printed oriented nylon, laminated, via an ester based adhesive, at its non-printed side to a transparent polyethylene terephthalate and at its printed side to cast polypropylene.

During retorting, it is not seldom noticed that the digital print of the flexible packaging container is affected and deteriorated and even totally loses its distinctive printing quality. Furthermore, for the particular case where the laminate comprises a reverse-printed layer, delamination-related defects at the interface polymer layer-print is often perceived.

Without contesting the associated advantages of the state of the art systems, it is nevertheless obvious that there is still a need for printed flexible retort packaging that can withstand extreme humidity, pressure and temperature conditions without color fading, image deformation and/or decrease of image sharpness of the print.

AIM OF THE INVENTION

The present invention aims to provide a retortable package comprising a flexible multilayer substrate comprising one or more print(s), preferably digital prints, and a method for the production of said multilayer substrate, said substrate presenting specific advantages over the above-mentioned prior art.

SUMMARY OF THE INVENTION

The present invention discloses a retortable package comprising a flexible multilayer substrate, said substrate comprising a reverse-printed layer, said reverse-printed layer comprising one or more crosslinked ink layer(s) characterized by a concentration of ethylenically unsaturated groups or alicyclic epoxides of less than 0.05 meq/g, preferably less than 0.03 meq/g, more preferably less than 0.01 meq/g, most preferably less than 0.005 meq/g.

Preferred embodiments of the present invention disclose one or more of the following features:
- the reverse-printed layer comprises a primer layer sandwiched between the crosslinked ink layers and the substrate;
- the reverse-printed layer is characterized in that the total layer thickness of primer and ink layer(s) is comprised between 0.4 and 4 µm, preferably between 0.6 and 3.5 µm, more preferably between 0.8 and 3 µm;
- the reverse-printed layer is characterized in that thickness of the primer is comprised between 0.01 and 0.5 µm, preferably between 0.05 and 0.4 µm, and more preferably between 0.1 and 0.3 µm;
- the retortable packaging comprises an outer structure, said outer structure comprising one or more reverse-printed layer(s), the bottom surface of the outer structure contacting the top surface of a middle structure, said middle structure comprising one or more barrier layer(s), the bottom surface of the middle structure contacting the top surface of an inner structure, said inner structure comprising a seal layer;
- the crosslinked ink layer of the flexible multilayer laminate remains substantially damage-free after a retort treatment at a temperature of at least 100° C., preferably at least 120° C.

The present invention further discloses a method for the production of a flexible multilayer substrate to be used in retortable packages, comprising the steps of:
a) providing a flexible substrate;
b) applying at least one digital print by a digital printing process of at least one ink composition, said ink composition being substantially free of (meth)acrylic double bonds and/or cycloaliphatic epoxy groups;
c) subjecting the digital print to an electron beam irradiation to form a crosslinked digital print;
d) contacting and affixing the flexible substrate, comprising the crosslinked digital print, with its printed side to an additional layer to form at least a part of the multilayer substrate.

Preferred embodiments of the method for producing the printed flexible substrate disclose one or more of the following features:
- the at least one ink composition is substantially free of components comprising molecular structures with dangling and/or end-standing ethylenically unsaturated double bonds and of components comprising alicyclic epoxides;
- the flexible packaging substrate of step a) is plasma treated, preferably corona plasma treated;
- an additional step comprises applying a primer composition before initiating step b);
- the digital printing process of step b) is liquid electrographic printing;
- the electron beam irradiation dose in step c) is at least 15 kGy, preferably at least 20 kGy, more preferably at least 25 kGy;
- the electron beam irradiation dose in step c) is comprised between 20 and 100 kGy, preferably between 25 and 80 kGy, more preferably between 30 and 60 kGy;
- the electron beam irradiation in step c) is performed at an oxygen concentration of less than 300 ppm, preferably less than 250 ppm, more preferably less than 200 ppm, most preferably less than 150 ppm;
- the flexible substrate of step a) comprises polyethylene terephthalate, high density polyethylene, oriented polypropylene, oriented polyamide or polystyrene;
- the primer composition comprises one or more polyacrylamide(s);
- the ink formulation comprises one or more (meth)acrylic (co)polymer(s) resin(s);
- the ink formulation comprises:
    from 20 to 95% by weight of hydrocarbon carrier liquid,
    from 5 to 80% by weight of one or more (meth)acrylic (co)polymer(s) resin(s),
    from 10 to 50% by weight of one or more carboxyl-functional ethylene comprising copolymer(s) co-resin(s) and
    from 0.1 to 80% by weight of one or more colorant(s).

DESCRIPTION OF THE INVENTION

The present invention discloses a retortable package comprising a flexible substrate, said flexible substrate comprising a middle structure comprising a barrier layer, an outer structure comprising a reverse-printed polymer layer laminated to one side of a middle structure and an inner structure comprising a seal layer laminated to an opposite side of the middle structure, the substrate being capable of withstanding a retort process at a temperature in excess of 100° C., preferably in excess of 120° C. without substantially deteriorating the print quality, the print being obtained from printing, preferably from digital printing of conventional inks, which are subsequently crosslinked through electron beam irradiation.

Upon retorting, the crosslinked ink layers remain substantially damage-free. By "substantially damage-free", the present invention means without decreasing the image sharpness of the print and/or fading of its composing colors.

By "image sharpness", the present invention means that the delineation and resolution of figures and images as well as the clarity of characters, numbers and symbols, down to 1 mm, are unchanged. Image sharpness is evaluated by the naked eye.

By fading of the colors the present invention means that the colorfastness as measured by ΔE according to CIELab is less than 4, preferably less than 3, more preferably less than 2.

Upon retorting the bond strength between the reverse-printed polymer layer and the layer contacting the reverse-printed layer at its printed side, measured according to ASTM F904-1998 (reapproved 2008), is at least 1.0 N/15 mm, preferably 1.3 N/15 mm more preferably at least 1.5 N/15 mm and is at least 10%, preferably at least 20%, more preferably 30%, most preferably at least 40% or even at least 50% higher than the bond strength for the particular case of a digital print exempt of electron beam irradiation.

Both the inner and the outer structures may comprise one or more barrier layer(s).

The middle structure may comprise one or more layer(s) to which no substantial barrier properties are assigned.

The barrier layer to be used in the flexible substrate of the present invention provides impermeability to gasses as well as to aromas and in particular prevents oxygen from penetrating the contents of the package prepared of said substrates.

The barrier layer may be a metal foil such as for example an aluminum foil or a pre-laminate comprising an aluminum foil and one or more polymer film(s) or a metallized polymer film such as metallized oriented polypropylene.

The barrier layer may be a coated polymer film, said coating being selected from the group consisting of aluminum oxide, silicium oxide, magnesium oxide, cerium oxide, hafnium oxide, tantalum oxide, titanium oxide, yttrium oxide, zirconium oxide and mixtures thereof.

Preferably, the barrier layer comprises a ceramic coating of aluminum oxide ($AlO_x$) or silicium oxide ($SiO_x$) on a polyethylene terephthalate film. The ceramic coating may be created by physical and/or chemical vapor deposition, plasma enhanced chemical vapor deposition or plasma polymerization.

Other barrier layers include carbon layers, polyacrylates, polyvinyl alcohol, ethylene vinyl alcohol copolymer, cellophane, polyamide and polyvinylidene chloride. A combination of barrier layers may be used.

Preferably, the inner structure comprises a seal layer such as a heat-sealable polyester, high density polyethylene, polypropylene or rubber modified polypropylene. Preferably, the inner structure comprises blown, cast or extrusion coated polypropylene.

The outer structure comprises a crosslinked digitally reverse-printed polymer layer, said polymer layer being selected from the group consisting of polyester, polyamide, polyolefin, polycarbonate, polystyrene and their copolymers; said digital print being crosslinked through electron beam irradiation.

Preferably, the outer structure comprises an electron beam crosslinked digitally reverse-printed oriented polyethylene terephthalate, oriented polypropylene, high density polyethylene, oriented polyamide and/or polystyrene film.

In a particular embodiment, the outer structure comprises an electron beam crosslinked digitally reverse-printed, ceramic coated oriented polyethylene terephthalate layer, the print contacting the ceramic coating.

The multilayer substrates can be produced by adhesive and/or extrusion lamination or a combination thereof.

For the particular case of adhesive lamination, the different layers are laminated using retortable adhesives such as for example organosilane, epoxy, polyester or polyurethane based adhesive.

Preferably, the adhesive is a two-component adhesive, more preferably a two-component polyurethane adhesive comprising one or more polyol(s) and one or more polyisocyanate(s), preferably aliphatic polyisocyanates.

For the particular case of extrusion lamination, tie layers comprising modified polypropylene, such as silane grafted polypropylene or maleic anhydride grafted polypropylene, polyesters, copolymers of ethylene, polyurethanes or polyacrylics may be used.

At least one layer of the outer structure is reverse-printed through digital printing, preferably liquid electrography.

By "reverse-printed" is meant that the inks are applied to the surface of the transparent layer, said surface being subsequently contacted and laminated to another layer, the inks are visible through the layer by transparency.

The retortable printed substrates of the present invention preferably comprise:
an outer structure comprising:
  a crosslinked digitally reverse-printed oriented polyethylene terephthalate film with
  a thickness comprised between 5 and 80 μm, adhered to
a middle structure comprising:
  a ceramic coated oriented polyethylene terephthalate film with a thickness comprised between 5 and 50 μm, and/or
  an oriented polyamide film with a thickness comprised between 5 and 40 μm; and/or
  an ethylene vinyl alcohol copolymer film with a layer thickness comprised between 3 and 10 μm; adhered to
an inner structure comprising:
  a cast polypropylene film with a thickness comprised between 40 and 120 μm;
the outward-facing surface of the substrate being polyethylene terephthalate and the inward-facing surface of the substrate being cast polypropylene;
the inner and outer structures optionally comprising one or more barrier layer(s); the middle structure optionally comprising one or more layer(s) to which no substantial barrier properties are assigned;
the structures/layers adhering through an adhesive or through the intermediary of a tie layer;
the reverse-printed oriented polyethylene terephthalate film, being obtained from electron beam curing of a liquid electrographic print.

The inventors have surprisingly found that digital prints, obtained from printing conventional ink formulations, comprising (meth)acrylic copolymer resins, are rendered retort proof through electron beam irradiation.

By "conventional ink formulations", the present invention means ink formulations that are not designed for being cured through UV or electron beam irradiation, i.e. ink formulations that are substantially free of (meth)acrylic double bonds and/or alicyclic epoxides.

The components composing the inks to be used in the present invention are substantially free of dangling or end-standing ethylenically unsaturated functional groups such as (meth)acryl, vinyl-, allyl-, and fumarate functional groups.

By "dangling ethylenically unsaturated groups", the present invention means functional groups that are not incorporated into the molecular backbone, contrary to for example unsaturated polyesters or butadiene comprising (co)polymers, where the ethylenically unsaturated groups are part of the backbone.

By "substantially free of ethylenically unsaturated groups", the present invention means that the concentration of ethylenically unsaturated groups is less than 0.2 meq/g, preferably less than 0.1 meq/g, more preferably less than 0.05 meq/g, most preferably less than 0.01 meq/g.

By "substantially free of alicyclic epoxides", the present invention means that the concentration of alicyclic epoxides is less than 0.2 meq/g, preferably less than 0.1 meq/g, more preferably less than 0.05 meq/g, most preferably less than 0.01 meq/g.

Preferably, the ink formulations to be used in the present invention are free of (meth)acrylic double bonds and/or alicyclic epoxides.

Preferably, the ink formulations to be used in the present invention do not comprise components comprising dangling and/or end-standing ethylenically unsaturated functional groups.

Prior art resins specially developed for UV and electron beam curing in general are characterized by a concentration of ethylenically unsaturated groups or of alicyclic epoxides higher than 1.0 meq/g, and even higher than 1.5 meq/g, the high concentration being sought for reactivity reasons.

Despite the substantial absence of such ethylenically unsaturated groups or of alicyclic epoxides, in the inks used in the present invention, the electron beam irradiation crosslinks the polymer chains, wherein the crosslinks preferably are carbon-carbon crosslinks.

The carbon-carbon crosslinks of the electron beam crosslinked ink of the present invention are preferably characterized in that the carbon atoms are tertiary or quaternary carbon atoms.

More preferably, the carbon-carbon crosslinks are of the type $(R^1)_2R^2C-C(R^1)_2R^3$ wherein:
$R^1$ is a (meth)acrylic copolymer segment;
$R^2$ is a hydrogen atom or a (meth)acrylic copolymer segment;
$R^3$ is a hydrogen atom, a methyl group or a (meth)acrylic copolymer segment;
as determined by Fourier Transformed InfraRed Spectroscopy.

The concentration of residual ethylenically unsaturated groups or alicyclic epoxides in crosslinked inks, obtained from irradiation of inks designed for crosslinking under influence of UV or EB, and comprising significant concentrations of ethylenically unsaturated groups or alicyclic epoxides, is higher than 0.05 meq/g, more preferably higher than 0.1 meq/g, most preferably higher than 0.2 meq/g, said residual ethylenically unsaturated groups or alicyclic epoxides resulting from an incomplete conversion due to viscosity increase upon increasing the degree of crosslinking.

The concentration of ethylenically unsaturated groups or alicyclic epoxides and the degree of conversion may be determined by combining titrations such as for example iodometric titrations with Fourier transformed infrared spectroscopy.

Despite the substantial absence of such ethylenically unsaturated groups or of alicyclic epoxides in the inks used in the present invention, the electron beam irradiation crosslinks the ink components.

The concentration of ethylenically unsaturated groups or alicyclic epoxides in conventional inks crosslinked on a substrate according to the method of the present invention is lower than 0.05 meq/g, preferably lower than 0.03 meq/g, more preferably lower than 0.01 meq/g, most preferably lower than 0.005 meq/g.

Preferably, the conventional inks crosslinked on a substrate according to the method of the present invention are free of ethylenically unsaturated groups and alicyclic epoxides.

Preferably, the conventional liquid ink formulations to be used in the present invention comprise one or more (meth)acrylic (co)polymer(s) resin(s).

More preferably, the liquid inks comprise a carrier liquid; a resin, preferably (meth)acrylic (co)polymer resin; a co-resin and a colorant.

The co-resin preferably comprises an ethylene acrylic acid co-polymer, a maleic anhydride polymer having polyethylene grafted to the polymer, and combinations thereof. The amount of co-resin is comprised between 10 and 50% by weight, preferably between 10 and 40% by weight, more preferably between 10 to 20% by weight of the ink formulation.

The resin preferably comprises (co)-polymers of (meth)acrylic acid; co-polymers of (meth)acrylic acid and alkyl (meth)acrylate; co-polymers of ethylene and (meth)acrylic acid; co-polymers of ethylene and alkyl(meth)acrylate; co-polymers of ethylene, (meth)acrylic acid and alkyl(meth)acrylate; co-polymers of ethylene and vinyl acetate; co-polymers of ethylene, (meth)acrylic acid and vinyl acetate; co-polymers of ethylene, alkyl(meth)acrylate and vinyl acetate; co-polymers of ethylene, (meth)acrylic acid, alkyl(meth)acrylate and vinyl acetate; co-polymers of (meth)acrylic acid and vinyl acetate; co-polymers of alkyl(meth)acrylate and vinyl acetate; co-polymers of (meth)acrylic acid, alkyl(meth)acrylate and vinyl acetate; polymers such as for example polyethylene; polystyrene; isotactic polypropylene; polyesters; polyvinyl toluene; polyamides; styrene/butadiene copolymers; epoxy resins; low molecular weight ethylene-acrylic acid ionomers and combinations thereof.

The amount of resin is comprised between 5 and 80% by weight, preferably between 10 and 60% by weight, more preferably between 15 and 40% by total weight of the ink formulation.

The carrier liquid preferably comprises a hydrocarbon selected from the group consisting of an (iso)paraffinic hydrocarbon, an aliphatic hydrocarbon, an isomerized aliphatic hydrocarbon, a branched chain aliphatic hydrocarbon, an aromatic hydrocarbon, a de-aromatized hydrocarbon, a halogenated hydrocarbon, a cyclic hydrocarbon, a functionalized hydrocarbon and combinations thereof. Preferably, the carrier is 3,5,7-trimethyldecane.

The amount of carrier liquid is comprised between 20 and 95% by weight, preferably between 40 and 90% by weight, more preferably between 60 and 80% by weight of the ink formulation.

The colorants are organic and/or inorganic colorants. The colorants may comprise cyan colorants, magenta colorants, yellow colorants, violet colorants, orange colorants, green colorants, black colorants, and combinations thereof. The amount of colorant is comprised between 0.1 and 80% by weight of the ink formulation.

The ink formulation may further comprise charge adjuvants, such as for example aluminum tristearate and charge directors such as for example sulfonic acids or salts thereof. Charge adjuvants are in general used in amounts comprised between 0.1 and 5% by weight, preferably between 0.5 and 4% by weight, more preferably between 1 and 3% by weight of the ink formulation while charge directors in general are used in an amount comprised between 0.001 and 1% weight of the ink formulation.

The side of the layer intended to receive the digital print first may be subjected to a physical compatibilization treatment such as a plasma treatment, preferably a corona plasma treatment, a flame treatment or the like in order to modify its surface energy. Another option is the application of a primer on the substrate. This primer application can also be preceded by a physical surface treatment.

The primer to be used in the present invention may be applied through digital printing. The primer preferably comprises a carrier fluid and a resin wherein the carrier is preferably a hydrocarbon as disclosed above and wherein the resin is preferably selected from the group consisting of cellulose, dextrin, maltose monohydrate, polyacrylic acid, polyvinylalcohol, styrene maleic anhydride copolymer, maleimide copolymer, polyacrylamide, sucrose octaacetate, sucrose benzoate and combinations thereof. Preferably, the primer to be used in the present invention comprises polyacrylamide.

The term "polyacrylamide" includes all (alk)acrylamide homopolymers as well as copolymers and functionalized polyacrylamides. The polyacrylamides may be anionic, cationic or nonionic. Various monomers, preferably ethylenically unsaturated monomers, may be copolymerized with (alk)acrylamide monomers to form the polyacrylamides.

At least one layer of the outer structure of the multilayer substrate of the present invention is provided at its reverse side with a crosslinked digital print, preferably obtained from liquid electrographic printing and electron beam irradiation.

The flexible substrate of the present invention comprises at least one layer comprising a primer and one or more ink layer(s), digitally-printed on the reverse side of the at least one layer wherein the total layer thickness of primer and ink layer(s) is comprised between 0.4 and 4 µm, preferably between 0.6 and 3.5 µm, more preferably between 0.8 and 3 µm and wherein the layer thickness of the primer is about 0.2 µm.

In the digital printing machine, the layer is loaded into the priming unwinder, where it is corona treated, to achieve better wetting and ink adhesion. In a next step, a primer is applied to enable covalent bonding between the substrate and the ink. The primer is dried in the drying station, whereupon it passes into the printing engine, preferably a liquid electrographic printing engine.

Preferably, a bi-axially oriented polyethylene terephthalate layer is provided from a supply roll and successively subjected to a plasma treatment unit, preferably a corona plasma treatment; a primer application unit; and a printing unit, preferably a digital printing unit, more preferably a liquid ink electrographic unit; and an electron beam irradiation unit.

Liquid electrography involves creating an image on a photoconductive surface by means of a laser, applying an ink having charged particles to the photoconductive surface, such that they selectively bind to the image, and then transferring the charged particles in the form of the image to a print polymer layer.

The photoconductive surface is typically on a cylinder and is often termed a photo imaging plate (PIP). The photoconductive surface is selectively charged with a latent electrostatic image having image and background areas with different potentials. For example, an electrostatic ink composition comprising charged particles in a carrier liquid can be brought into contact with the selectively charged photoconductive surface. The charged particles adhere to the image areas of the latent image while the background areas remain clean. The image is then transferred to a print polymer layer directly or, more commonly, by being first transferred to an intermediate transfer member, which can be a soft swelling blanket, and then to the print polymer layer. Ink transfer is forced by an applied electrical field and carrier ink liquid is evaporated from the blanket. The hot melted ink is adhered to the polymer layer by means of pressure and tackiness. The process is repeated for every color. Principally, the ink transfers to the polymer without change and without penetrating into the substrate. Hence, the resulting image quality is very high.

The polymer layer comprising the digital print is subsequently subjected to electron beam bombardment.

A electron beam processing device generally includes three zones, i.e. a vacuum chamber zone where a particle beam is generated, a particle accelerator zone, and a processing zone. In the vacuum chamber, a tungsten filament(s) is/are heated to, for example, about 2400K, which is the thermionic emission temperature of tungsten, to create a cloud of electrons. A positive voltage differential is then applied to the vacuum chamber to extract and simultaneously accelerate these electrons. Thereafter, the electrons pass through a thin foil and enter the processing zone. The thin foil functions as a barrier between the vacuum chamber and the processing zone. Accelerated electrons exit the vacuum chamber through the thin foil and enter the processing zone.

Electron energies are comprised between 10 and 300 keV, preferably between 20 and 250 keV, preferably between 30 and 200 keV.

The irradiation dose received by the digitally-printed ink is comprised between 15 and 100 kGy, preferably between 20 and 80 kGy, more preferably between 30 and 60 kGy.

The electron beam irradiation of the digital print is performed in an oxygen-poor region obtained through the application of a vacuum or through the use of an inert gas blanket such as a nitrogen blanket.

By "oxygen poor medium", the present invention means an oxygen concentration less than 300 ppm, preferably less than 250 ppm, more preferably less than 200 ppm, most preferably less than 150 ppm or even less than 100 ppm.

After electron beam bombardment of the digitally-printed polymer layer, said layer is further processed into a multilayer substrate.

In the lamination process, the polymer layer comprising the crosslinked digital print is laminated with its printed side to the middle structure, said middle structure preferably comprising a barrier layer, more preferably a polyethylene terephthalate layer comprising a ceramic coating and/or an oriented polyamide layer. The middle structure is laminated at its other side to the inner structure, said inner structure preferably comprising cast polypropylene seal layer and optionally comprising one or more additional layer(s) such as for example a polyethylene vinyl alcohol barrier layer.

In a particular embodiment, the polymer layer comprising the crosslinked digital print is laminated with its printed side to a laminate comprising the middle and the inner structure.

The multilayer substrate may subsequently be heat-sealed at a temperature comprised between 100 and 250° C., preferably between 110 and 230° C., more preferably between 120 and 220° C. at a pressure comprised between 20 and 120 N/cm$^2$, preferably between 20 and 110 N/cm$^2$, more preferably between 40 and 100 N/cm$^2$ to form a flexible retort package such as a retort pouch.

EXAMPLES

The following illustrative examples are merely meant to exemplify the present invention but are not destined to limit or otherwise define the scope of the present invention.

Example 1

A polyethylene terephthalate (PET) 12 μm film was treated by Corona (400 W) and subsequently introduced into the HP 20000 Indigo digital printing system where it was provided with a colorless digital primer Digiprime® 050 from Michelman at a layer thickness of about 0.2 μm whereupon
- half of the surface of the PET film was covered with cyan ink layer, at a layer thickness of about 1 μm,
- while the other half was printed with a cyan pattern comprising 10 vertical lines and 10 horizontal lines, each of 50 mm length and a width of 0.3 mm, with a 1 mm, a 2 mm and a 3 mm spacing, respectively and intersecting at an angle of 90°, the pattern being printed at a thickness of 1 μm.

The digitally-printed PET film was then transferred to a vacuum electron beam processing device.

The electron beam gun has a deflection system which is computer controlled and has been programmed in a manner such that the gun radiating onto the drum was normally used as a coating drum. The printed film, passing over this coating drum, was irradiated by the electron beam gun. The deflection system was programmed to allow the electron beam scanning over an area of 200 mm (winding direction)×400 mm (cross direction) and therefore radiating this area. By passing the web with a speed of 15 m/min. through this zone, the ink was irradiated for 0.6 seconds. The electron beam gun was operated at an acceleration voltage of 35 kV, resulting in electrons with an energy of 35 keV. The emission current was 0.42 A, resulting in a total radiation power of 15 kW is scanning over an area.

The electron beam irradiated digitally-printed PET sample was laminated with its printed side against a 8 μm aluminum foil, said aluminum foil being laminated at its opposite side against a 60 μm polypropylene film. The lamination was carried out with the use of solvent-based two component polyurethane adhesive Liofol® UR3644/Liofol® UR6055 (Henkel) in a ratio 13/1 at a dry layer thickness of 4 μm.

The flexible multilayer substrate then was sterilized in an autoclave at a temperature of 121° C. for 30 minutes.

Example 2

A 72 μm $SiO_x$-coated polyethylene terephthalate was Corona treated, provided with a colorless digital primer and printed as in Example 1, and subsequently laminated with its printed side against a 15 μm biaxially oriented polyamide film, said polyamide film being laminated at its opposite side against a 70 μm white cast polypropylene film. The lamination was carried out with the use of solvent based two component polyurethane adhesive Adcote™ 811A/Catalyst 9L10 (Rohm and Haas) in a ratio 92/8 at a dry layer thickness of 2 μm. The flexible multilayer substrate then was sterilized in an autoclave as in Example 1.

Example 3

The ink quality of the laminate of Examples 1 and 2 was evaluated for the digital printed ink subjected to different doses of electron beam irradiation In Table 1:
- Row 1 represents the irradiation dose, in kGy, applied to the digital print before lamination;
- Row 2 represents the color fastness/color change upon retorting, as measured by ΔE according to CIELab, according to DIN 6174;
- Row 3 represents the gloss reduction as measured with a 60° geometry according to ASTM D523 upon retorting where the gloss reduction equals $G^{init}-(100*G^{ret}/G^{init})$ with $G^{init}$ being the gloss before retorting and $G^{ret}$ being the gloss after retorting;
- Row 4 represents the image sharpness upon retorting wherein the represented value indicates the lowest spacing of the pattern with clear delineation and resolution (initial sharpness was at 1 mm spacing);
- Row 5 represents the bond strength (N/15 mm) between the reverse-printed polymer layer and the layer contacting the reverse-printed layer at its printed side, peeled at 90° with a speed of 100 mm/min. according to ASTM F904-1998 (reapproved 2008), after retorting.

TABLE 1

|  | Example 1 | | | | Example 2 | | | |
| --- | --- | --- | --- | --- | --- | --- | --- | --- |
| Irradiation dose | 0 | 15 | 20 | 30 | 0 | 15 | 20 | 30 |
| Color change | 5.5 | 5.2 | 3.5 | 1.2 | 5.0 | 4.5 | 3.8 | 0.8 |
| Gloss reduction | 35 | 32 | 18 | 3 | 30 | 26 | 15 | 1 |
| Image sharpness | >3 | >3 | 2 | 1 | >3 | >3 | 2 | 1 |
| Bond strength | 1.09 | 1.03 | 1.22 | 1.70 | 1.05 | 1.10 | 1.35 | 1.90 |

Example 4

Examples 1 and 2 were repeated, wherein the cyan ink was substituted by black ink, magenta ink, orange ink, violet ink, white ink and yellow ink, respectively. A similar tendency as in Example 3 was observed, with a substantially total disappearance of the defects at an irradiation dose of 30 kGy.

The invention claimed is:

1. A retortable package comprising a flexible multilayer substrate, said substrate comprising a reverse-printed layer, said reverse-printed layer comprising one or more digitally printed electron beam crosslinked ink layer(s) wherein the concentration of ethylenically unsaturated groups or alicyclic epoxides in the ink layer(s) is less than 0.05 meq/g.

2. The retortable packaging according to claim 1 wherein the concentration of ethylenically unsaturated groups or alicyclic epoxides is less than 0.01 meq/g.

3. The retortable packaging according to claim 1 wherein the reverse-printed layer comprises a primer layer sandwiched between the crosslinked ink layers and the substrate.

4. The retortable packaging according to claim 1 wherein the total layer thickness of primer and ink layer(s) of the reverse-printed layer is comprised between 0.4 and 4 μm.

5. The retortable packaging according to any of claim 1 wherein the thickness of the primer of the reverse-printed layer is comprised between 0.01 and 0.5 μm.

6. The retortable packaging according to claim 1 wherein the crosslinked ink layer of the flexible multilayer laminate remains substantially damage-free after a retort treatment at a temperature of at least 100° C.

7. A retortable packaging comprising an outer structure, said outer structure comprising one or more reverse-printed layer(s), the bottom surface of the outer structure contacting the top surface of a middle structure, said middle structure comprising one or more barrier layer(s), the bottom surface of the middle structure contacting the top surface of an inner structure, said inner structure comprising a seal layer, wherein the reverse-printed layer(s) comprise(s) one or more digitally printed electron beam crosslinked ink layer(s) wherein the concentration of ethylenically unsaturated groups or alicyclic epoxides is less than 0.05 meq/g.

8. A method for the production of a flexible multilayer substrate to be used in retortable packages, according to claim 1 comprising the steps of:
 a) providing a flexible substrate;
 b) applying at least one digital print by a digital printing process of at least one ink composition, said ink composition being substantially free of (meth)acrylic double bonds and/or cycloaliphatic epoxy groups;
 c) subjecting the digital print to an electron beam irradiation to form a crosslinked digital print,
 d) contacting and affixing the flexible substrate, comprising the crosslinked digital print, with its printed side to an additional layer to form at least a part of the multilayer substrate.

9. The method according to claim 8 wherein the at least one ink composition is substantially free of components comprising molecular structures with dangling and/or end-standing ethylenically unsaturated double bonds and of components comprising alicyclic epoxides.

10. The method according to claim 8 wherein the flexible packaging substrate of step a) is plasma treated, preferably corona plasma treated.

11. The method according to claim 8 comprising the additional step of applying a primer composition before initiating step b).

12. The method according to claim 8 wherein the digital printing process of step b) is liquid electrographic printing.

13. The method according to claim 8 wherein the electron beam irradiation dose in step c) is at least 15 kGy.

14. The method according to claim 8 wherein the electron beam irradiation dose in step c) is comprised between 20 and 100 kGy.

15. The method according to claim 8 wherein the electron beam irradiation in step c) is performed at an oxygen concentration of less than 300 ppm.

16. The method according to claim 8 wherein the flexible substrate of step
 a) comprises polyethylene terephthalate, high density polyethylene, oriented polypropylene, oriented polyamide or polystyrene.

17. The method according to claim 8 wherein the primer composition comprises one or more polyacrylamide(s).

18. The method according to claim 8, wherein the ink formulation comprises one or more (meth)acrylic (co)polymer(s) resin(s).

19. The method according to claim 8 wherein the ink formulation comprises:
 from 20 to 95% by weight of hydrocarbon carrier liquid,
 from 5 to 80% by weight of one or more (meth)acrylic (co)polymer(s) resin(s),
 from 10 to 50% by weight of one or more carboxyl-functional ethylene comprising copolymer(s) co-resin(s) and
 from 0.1 to 80% by weight of one or more colorant(s).

* * * * *

UNITED STATES PATENT AND TRADEMARK OFFICE
CERTIFICATE OF CORRECTION

PATENT NO. : 11,376,831 B2
APPLICATION NO. : 16/086082
DATED : July 5, 2022
INVENTOR(S) : Steven Welvaert et al.

It is certified that error appears in the above-identified patent and that said Letters Patent is hereby corrected as shown below:

In the Claims

Column 13, Claim 8, Line 17: After "print", delete "," and insert -- ; --, therefor.

Signed and Sealed this
Eighteenth Day of July, 2023

Katherine Kelly Vidal
*Director of the United States Patent and Trademark Office*